UNITED STATES PATENT OFFICE 2,675,393

CYCLIZATION PROCESS OF GERANYLACETONES, IN ORDER TO OBTAIN A MIXTURE OF TETRAMETHYL - 2,5,5,9 - HEXAHYDROCHROMENES

Yves René Naves, Geneva, Switzerland, assignor to Givaudan-Delawanna Inc., New York, N. Y., a corporation of New Jersey No Drawing. Application August 29, 1951, Serial No. 244,283

2 Claims. (Cl. 260—345.2)

The applicant did find out that treating the mixture of the geranylacetones stereoisomers (I), as well as that of the geranylacetone of which the semicarbazone melts at 96°–96.5°, by means of boron trifluoride, according to the conditions he has claimed (U. S. Patent No. 2,517,800, allowed on August 8, 1950) for producing α-irones from pseudoirones, leads to a mixture of tetramethyl-2,5,5,9 - hexahydrochromenes stereoisomers (II).

This mixture, treated in hydro-alcoholic medium by semicarbazide acetate, easily gives the semicarbazone melting at 193°–193.5° of one of hydroxy - 3 - tetrahydroionones stereoisomers (III) from which the pure tetramethyl-2,5,5,9-hexahydrochromene can be easily regenerated.

The easy obtention of the tetramethyl-2,5,5,9-hexahydrochromenes offers a marked interest, as it enables to reach, by dehydratation of the hydroxy-3-tetrahydroionones or of their derivatives, the dihydro-ionones (IV) or their derivatives. On the other hand, the splitting of the tetramethyl - hexahydrochromene molecule at the ethylenic bond, by one of the usual breaking-up methods of such a connection, enables to obtain the derivatives of the hydroxy-2-trimethyl-2,6,6 - cyclohexyl-acetic aldehydes (V), and through them, the aldehydes (VI) corresponding to the dehydration of these latter.

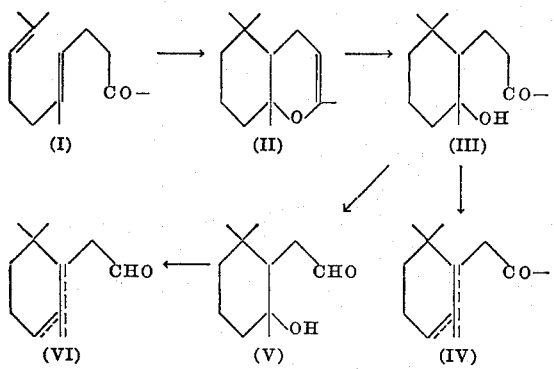

The tetramethyl-2,5,5,9-hexahydrochromenes stereoisomers, or at least that of which the reaction with semi-carbazide acetate gives the semicarbazone melting at 193°–193.5°, have been prepared by a complicated and low yielding method, starting from the dihydro-α-ionone, by Stoll, Ruzicka and Seidel (Helvetica Chimica Acta t. 33, p. 1245 (1950)). The process which is the object of the present invention shows, from its simplicity and from its yields points of view, marked advantages over that imagined and carried out by above mentioned authors. The invention relates to a cyclization process of geranylacetones, characterized by the use of boron trifluoride, acting in anhydrous medium, and leading to the production of a mixture of tetramethyl - 2,5,5,9-hexahydrochromenes, of which one of the components can easily be converted into a hydroxy-3-tetrahydroionone.

This process can be extended to the treatment and to obtention of homologs of the mentioned substances.

Example 97 gr. of geranylacetone, obtained by hydrolysis of the semicarbazone F 96°–96.5°, produced, with a 60% yield from the theory, from the mixture of geranylacetones resulting the treatment of a mixture of linalöol and acetylacetic ester according to Carroll, have been treated by boron trifluoride according to the conditions claimed for the production of α-ionone and its homologs.

To the solution of the product in 300 gr. of dry toluene, cooled down to 0° by means of a chilling mixture, and vigorously agitated, have been added, within 45 minutes, 34 gr. of boron trifluoride. As soon as some 30 gr. have been introduced, the temperature rose to 12–15° and the chilling mixture was temporarily removed, in order to keep the temperature to nearly 15° during 10 minutes. The product, under constant stirring, was then brought back to 6°–8° and, at a temperature below 10°, 500 cm.³ of an 8% aqueous caustic soda solution were added as quickly as possible. When through with addition, the toluenic layer was decanted, then washed neutral; the toluene was removed by evaporation and the residue was fractional by distillation. The first distillation gave:

(1) 33.6 gr.; Eb₂=75°–85°; $n_D^{20}$=1.4820 to 1.4800.
(2) 39.5 gr.; Eb₂=85°–105°; $n_D^{20}$=1.4770 to 1.4680.
(3) 16.0 gr. not distilled at 105°.

The same treatment was twice renewed on fraction (2), so that the total yield in (1) fractions reached 52.5 gr., that is to say 54% (in weight) of the initial product, their mixture consisting essentially of tetramethyl-2,5,5,9-hexahydrochromenes stereoisomers.

To 36.4 gr. of this mixture and 400 cm.³ of methanol have been added the solution of 27 gr. of semicarbazide chlorhydrate and 32.4 gr. of aqueous sodium acetate in 50 cm.³ of water. The semicarbazone, centrifuged after resting during 24 hours and addition of 50 cm.³ of water, has been re-crystallised in 80% methanol, which led to 18.9 gr. of semicarbazone melting at 193°–193.5°, corresponding to the composition: $C_{14}H_{27}O_2N_3$.

The fractions not combined with the semicarbazide, rectified by means of steam and fractional by distillation, in all 16 gr., contained the uneasily hydrolysable tetramethyl-2,5,5,9-hexahydrochromene: $Eb_2 = 76°–84°$; $d_4^{20} = 0.9436$ to $0.9464$; $n_D^{20} = 1.4850$ to $1.4840$, which combines easily with the ferro- and ferri-cyanhydric acids.

20 gr. of semicarbazone, collected from several runs, were impasted with 80 cm.³ of benzene and, to this paste, were added, between 5° and 10°, 40 cm.³ of concentrated sulphuric acid (62.5%), shaking being carried out by hand. As soon as the pasting was dissolved, the acid was diluted by adding 80 cm.³ of cold water. The benzene layer, washed neutral, on evaporation, left a raw product which was distilled. Thus, tetramethyl-2,5,5,9-hexahydrochromenes was obtained, in 89% yield of the theory:

$Eb_2 = 82°–83°$; $d_4^{20} = 0.9513$; $n_D^{20} = 1.48652$

The latter, treated by semicarbazide acetate, in hydroalcoholic solution, gave back the semicarbazone of the hydroxy-3-tetrahydroionone. The dinitro-2,4-phenylhydrazone of this hydroxyketone melts at 125°–125.5°, and the phenyl-4-semicarbazone at 136°–136.5°.

The products which are the object of the present invention are intended for the synthesis of odoriferous substances.

I claim:

1. In the process for preparing tetramethyl-2,5,5,9-hexahydro-chromenes, the improvement which comprises treating under anhydrous conditions geranylacetone with boron trifluoride.

2. In the process for preparing tetramethyl-2,5,5,9-hexahydrochromenes, the improvement which comprises treating about 97 grams of geranylacetone whose semicarbazone melts at 96° to 96.5° C. with about 34 grams of boron trifluoride under anhydrous conditions at a temperature within the range of about 0°–15° C.

References Cited in the file of this patent

UNITED STATES PATENTS

| Number | Name | Date |
|--------|------|------|
| 768,389 | Merling | Aug. 23, 1904 |
| 2,517,576 | Kitchens | Aug. 8, 1950 |
| 2,517,800 | Naves | Aug. 8, 1950 |